(12) United States Patent
Ulrich

(10) Patent No.: US 8,522,726 B2
(45) Date of Patent: Sep. 3, 2013

(54) HEAD GATE FOR A LIVESTOCK SQUEEZE CHUTE

(76) Inventor: Matthew J. Ulrich, Dodge, NE (US)

( * ) Notice: Subject to any disclaimer, the term of this patent is extended or adjusted under 35 U.S.C. 154(b) by 103 days.

(21) Appl. No.: 13/199,770

(22) Filed: Sep. 8, 2011

(65) Prior Publication Data

US 2013/0061818 A1 Mar. 14, 2013

(51) Int. Cl.
*A01K 1/062* (2006.01)

(52) U.S. Cl.
USPC .......................................... 119/734; 119/746

(58) Field of Classification Search
USPC .................. 119/712, 729, 734, 735, 738, 746, 119/843, 744
See application file for complete search history.

(56) References Cited

U.S. PATENT DOCUMENTS

| | | | | |
|---|---|---|---|---|
| 3,368,530 | A * | 2/1968 | Bearss | 119/734 |
| 3,720,187 | A * | 3/1973 | McDonough | 119/734 |
| 4,702,200 | A | 10/1987 | Simington | |
| 5,263,438 | A * | 11/1993 | Cummings | 119/734 |
| 6,609,480 | B2 | 8/2003 | Daniels et al. | |
| 7,770,542 | B2 * | 8/2010 | Mollhagen | 119/734 |

* cited by examiner

*Primary Examiner* — Rob Swiatek
*Assistant Examiner* — Lisa Tsang
(74) *Attorney, Agent, or Firm* — Dennis L. Thomte; Thomte Patent Law Office LLC

(57) ABSTRACT

A livestock squeeze chute having a head gate assembly at the head end thereof with the head gate assembly including first and second head gates which dwell in a plane which is approximately at a 30-degree angle with respect to the longitudinal axis of the squeeze chute. Power cylinders pivotally move the head gates between open and closed positions. Although power cylinders are preferred, the head gates could be manually moved between their open and closed positions.

6 Claims, 4 Drawing Sheets

HEAD GATE FOR A LIVESTOCK SQUEEZE CHUTE

BACKGROUND OF THE INVENTION

1. Field of the Invention

This invention relates to a head gate for a livestock squeeze chute and more particularly to a novel head gate which is movably positioned on a hydraulic squeeze chute. More particularly, this invention relates to a head gate for a cattle squeeze chute which consists of two gates that move in unison from fixed pivot points at the bottom of the chute frame at the head end thereof. Even more particularly, this invention relates to a cattle head gate of the type described wherein each of the head gates move from an open position to a closed position at a 30-degree angle with respect to the animal's body rather than transversely with respect to the animal's body.

2. Description of the Related Art

In the practice of livestock husbandry, it is necessary to restrain livestock such as cattle and bison. This is common for treating or performing typical procedures on the livestock such as weighing, vaccinations, identification references, doctoring and sorting. The head gate is part of the hydraulic squeeze chute that is used to catch the animal's head to restrain the animal. The restraint consists of keeping the animal still and safe to administer typical procedures. By reason of the massive weight and power of the animal and the excited state it is in, often there is a substantial force put on the animal's front quarters when it impacts the head gate. This can result in injury to the animal by bruising the muscle and lost profits for the producer.

Most head gates on the market today, move in a transverse 90-degree motion to the animal causing abrupt stoppage to the animal. This leads to excess trauma to the animal. Other head gates on the market today catch the animal in an inward back motion. This puts excess pressure on the animal's front quarters by pressing against the flow of motion. The industry of cattle handling needs to keep the safety of the animal at a top priority for humane handling as well as producing top quality meat products.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

The head gate of this invention is designed to be used on a livestock squeeze chute wherein the squeeze chute has a tail end and a head end. The squeeze chute comprises a lower frame having a tail end, a head end, a first side and a second side. The squeeze chute also includes an upper frame positioned above the lower frame which has a tail end, a head end, a first side and a second side. A tail gate assembly is provided on the squeeze chute at the tail ends of the lower and upper frames for selectively closing the tail end of the chute. The tail gate assembly includes first and second tail gate members which are movable between open and closed positions in conventional fashion.

A horizontally disposed lower head gate support is provided at the head end of the lower frame with the lower head gate support being generally V-shaped and including first and second support members having rearward and forward ends. The first support member extends forwardly and inwardly from the head end of the lower frame at the first side thereof. The second support member extends forwardly and inwardly from the head end of the lower frame at the second side thereof. The forward ends of the first and second support members of the lower head gate support are secured together.

A horizontally disposed upper head gate support is provided at the head end of the upper frame. The upper head gate support is generally V-shaped and includes first and second support members having rearward and forward ends. The first support member of the upper head gate support extends forwardly and inwardly from the head end of the upper frame at the first side thereof. The second support of the upper head gate support extends forwardly and inwardly from the head end of the upper frame at the second side thereof. The forward ends of the first and second support members of the upper head gate support are secured together.

The first support member of the upper head gate support has an elongated slot formed therein which has rearward and forward ends. The second support member of the upper head gate support has an elongated slot formed therein which has rearward and forward ends. The forward ends of the two slots communicate with one another.

A first upstanding head gate member is provided having an upper end, a lower end, an outer side, an inner side, a forward side and a rearward side. A second upstanding head gate member is also provided which has an upper end, a lower end, an outer side, an inner side, a forward side and a rearward side. The first head gate member has an upwardly extending protrusion at its upper inner end which is movably received by the slot in the first support member of the upper head gate support. The second head gate member has an upwardly extending protrusion at its upper inner end which is movably received by the slot in the second support member of the upper head gate support.

The first head gate member is pivotally secured at its lower inner end to the first support member of the lower head gate support. The second head gate member is pivotally secured at its lower inner end to the second support member of the lower head gate support.

Hydraulic cylinders are secured to the first and second head gate members for pivotally moving the head gate members between open and closed positions. The head gate members, when in their closed positions, extend forwardly and inwardly to conform to the configuration of the animal captured by the head gate members.

It is therefore a principal object of this invention to provide an improved head gate for a hydraulic squeeze chute to conform the head gate to the body structure of the animal to increase the surface area of impact which will result in reducing force per square inch which will lead to increased safety of the animal.

A further object of the invention is to provide an improved head gate assembly for a hydraulic squeeze chute wherein the head gates thereof extend forwardly and inwardly so as to dwell in a substantially V-shape when in their closed positions.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
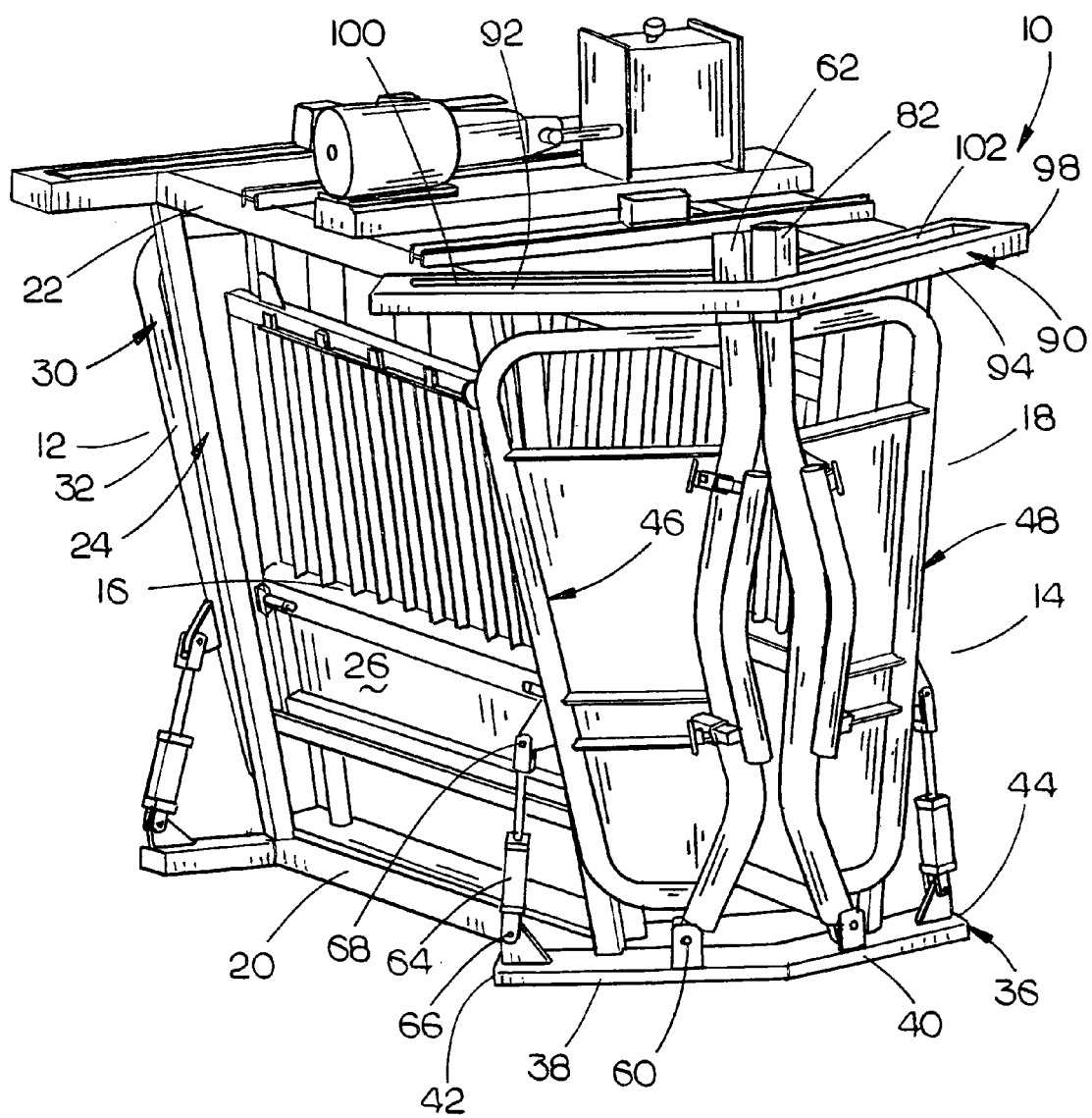
FIG. 1 is an upper front perspective view of the squeeze chute with the head gate of this invention in a completely closed position.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a livestock squeeze chute having a tail end 12, a head end 14, a first side 16 and a second side 18. Squeeze chute 10 includes a lower frame means 20 which extends between the tail end 12 and the head end 14 of the squeeze chute 10. Squeeze chute 10 also includes an upper frame means 22 which extends between the tail end 12 and the head end 14 of the squeeze chute 10. The lower frame means 20 and the upper frame means 22 are interconnected by various frame members generally collectively referred to by the reference numeral 24. The squeeze chute 10 includes spaced-apart side panels 26 and 28 which are laterally movable in conventional fashion to aid in restraining the animal being handled.

The numeral 30 refers generally to a conventional tail gate assembly consisting of two movable tail gates 32 and 34 which are selectively movable between open and closed positions in a transverse manner with respect to the longitudinal axis of the squeeze chute 10. The tail gates 32 and 34 are pivotally movable by hydraulic cylinders attached thereto in conventional fashion.

The numeral 36 refers to a horizontally disposed lower head gate support including a first support member 38 and a second support member 40 which are joined together at their inner forward ends to define a V-shape. As seen, support member 38 extends inwardly and forwardly from side 16 at approximately 30 degrees to the longitudinal axis of the chute 10 at the head end 14 of squeeze chute 10. Support member 38 has a rearward end 42 which is positioned outwardly of the squeeze chute 10. As seen, support member 40 extends forwardly and inwardly from side 18 of squeeze chute 10 at approximately a 30-degree angle with respect to the longitudinal axis of the chute 10. Support member 40 has a rearward end 44 which is positioned outwardly of the squeeze chute 10.

The numeral 46 refers to a first head gate member while the numeral 48 refers to a second head gate member. Head gate member 46 includes an upper end 50, a lower end 52, an outer side 54 and an inner side 56. Inner side 56 of head gate member 46 has an outwardly extending angular or arcuate portion 58 to provide a space for the animal's neck. The lower end 52 of head gate member 40 is pivotally secured to support member 38 at 60. The upper inner end of head gate member 46 has an upwardly extending protrusion or contact point 62, the purpose of which will be described hereinafter. The lower end of a hydraulic cylinder 64 is pivotally connected to the rearward end 42 of support member 38 at 66. The rod end of hydraulic cylinder 64 is pivotally secured to head gate member 46 at 68.

Head gate member 48 includes an upper end 70, a lower end 72, an outer side 74 and an inner side 76. Inner side 76 of head gate member 48 has an outwardly extending angular or arcuate portion 78 to provide a space for the animal's neck. The lower end 72 of head gate member 48 is pivotally secured to support member 40 at 80. The upper inner end of head gate member 48 has an upwardly extending protrusion or contact point 82, the purpose of which will be described hereinafter. The lower end of a hydraulic cylinder 84 is pivotally connected to the rearward end 44 of support member 40 at 86. The rod end of hydraulic cylinder 84 is pivotally secured to head gate member 48 at 88.

The numeral 90 refers to a horizontally disposed upper head gate support including a first support member 92 and a second support member 94 which are joined together to define a V-shape which is the same as the V-shaped support 36. As seen, support member 92 extends inwardly and forwardly from side 16 at the head end 14 of squeeze chute 10. Support member 92 has a rearward end 96 which is positioned outwardly of the squeeze chute 10. As also seen, support member 94 extends forwardly and inwardly from side 18 of the squeeze chute 10. Support member 94 has a rearward end 98 which is positioned outwardly of the squeeze chute 10.

Support member 92 has an elongated slot 100 formed therein and support member 94 has an elongated slot 102 formed therein. The forward ends of the slots 100 and 102 communicate with each other. Protrusion 62 of head gate member 46 extends upwardly through slot 100 in support member 92 with protrusion 82 of head gate member 48 extending upwardly through slot 102 in support member 94.

Figure 2:
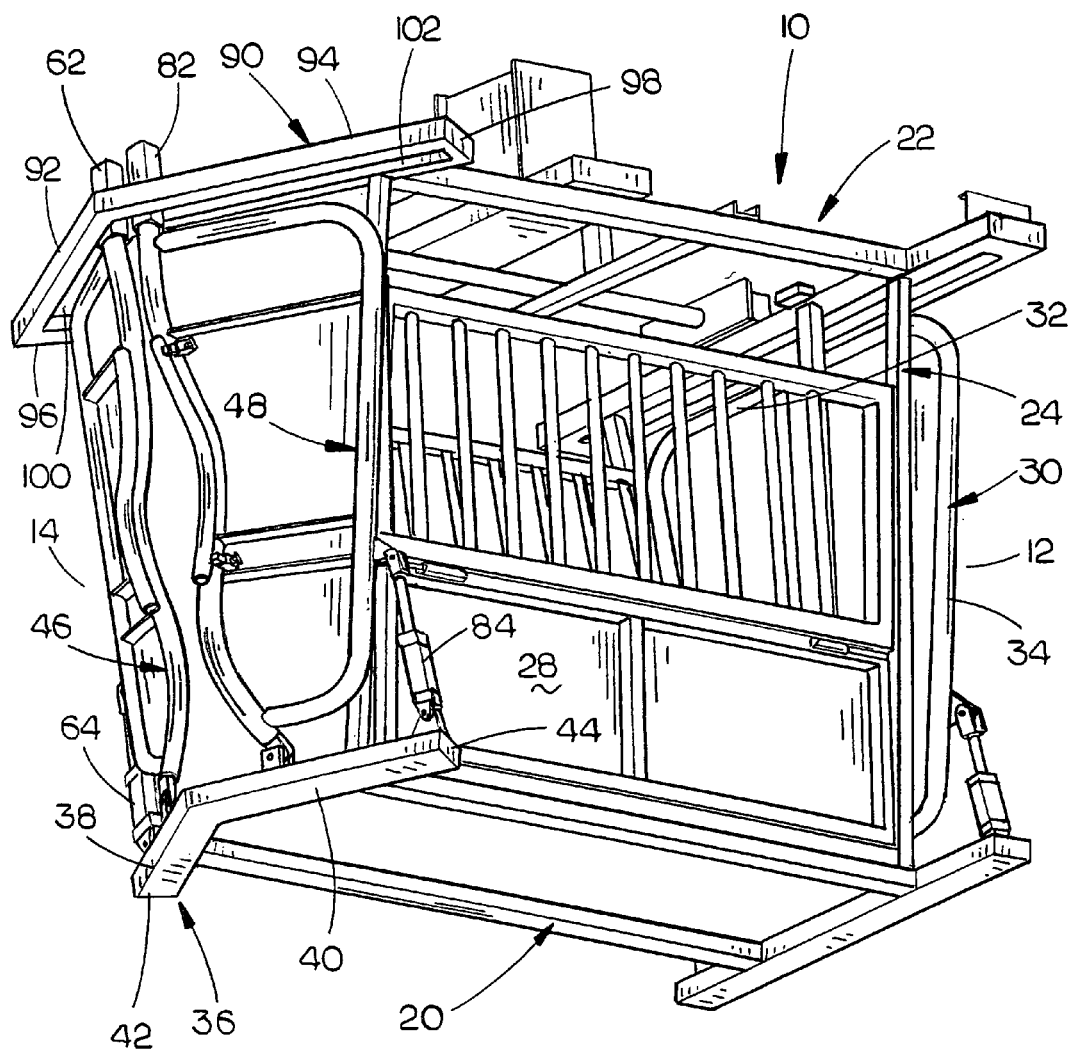
FIG. 2 is a lower front perspective view of the squeeze chute with the head gate of this invention in a completely closed position.
Figure 3:
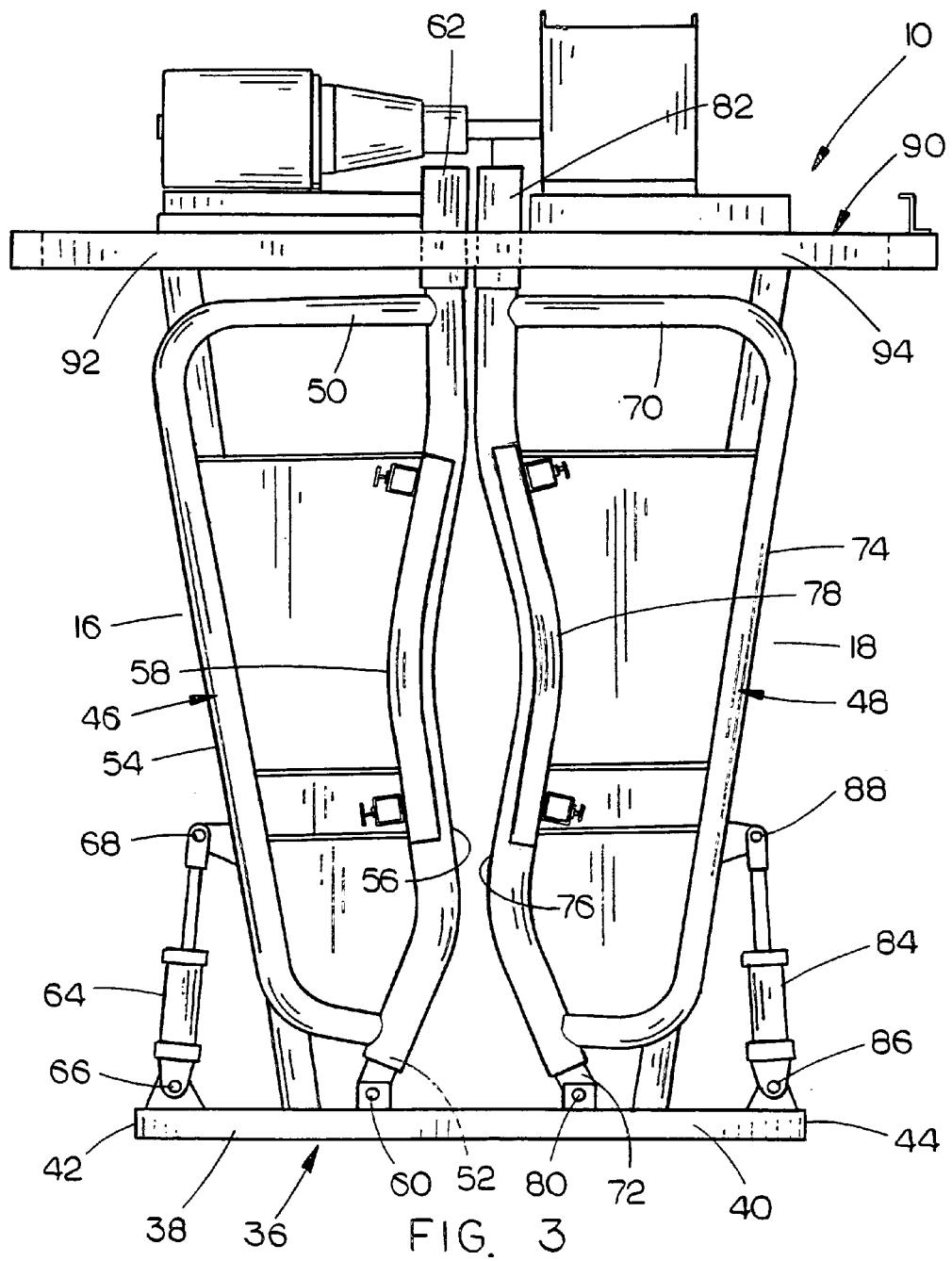
FIG. 3 is a front view of the squeeze chute with the head gate in a completely closed position.

The squeeze chute 10 is operated as follows when it is desired to perform a procedure on an animal. The head gate members 46 and 48 will initially be completely closed in the position of FIGS. 1-3. Tail gate assembly 30 will be moved to its open position to allow the animal to enter the chute 10. As soon as the animal has entered the chute 10, the tail gate assembly 30 will be closed. Hydraulic cylinders 64 and 84 will be retracted somewhat so that the animal may extend the animal's head and neck through the opening defined by the angular or arcuate portions 58 and 78 in head gate members 46 and 48 respectively. When the animal's head has been captured between the head gate members 46 and 48, the head gate members 46 and 48 may be partially closed to keep the animal still and safe. The head gate members 46 and 48, when in their closed positions, extend forwardly and inwardly to conform to the configuration of the animal captured by the head gate members.

The angular configuration of the head gate members 46 and 48 substantially reduces the pressure on the animal's front quarters which would be exerted on the animal by transversely extending head gate members. The angular configuration of the head gate members 46 and 48 keeps the safety of the animal at a top priority for humane handling, as well as producing top quality meats.

Figure 4:
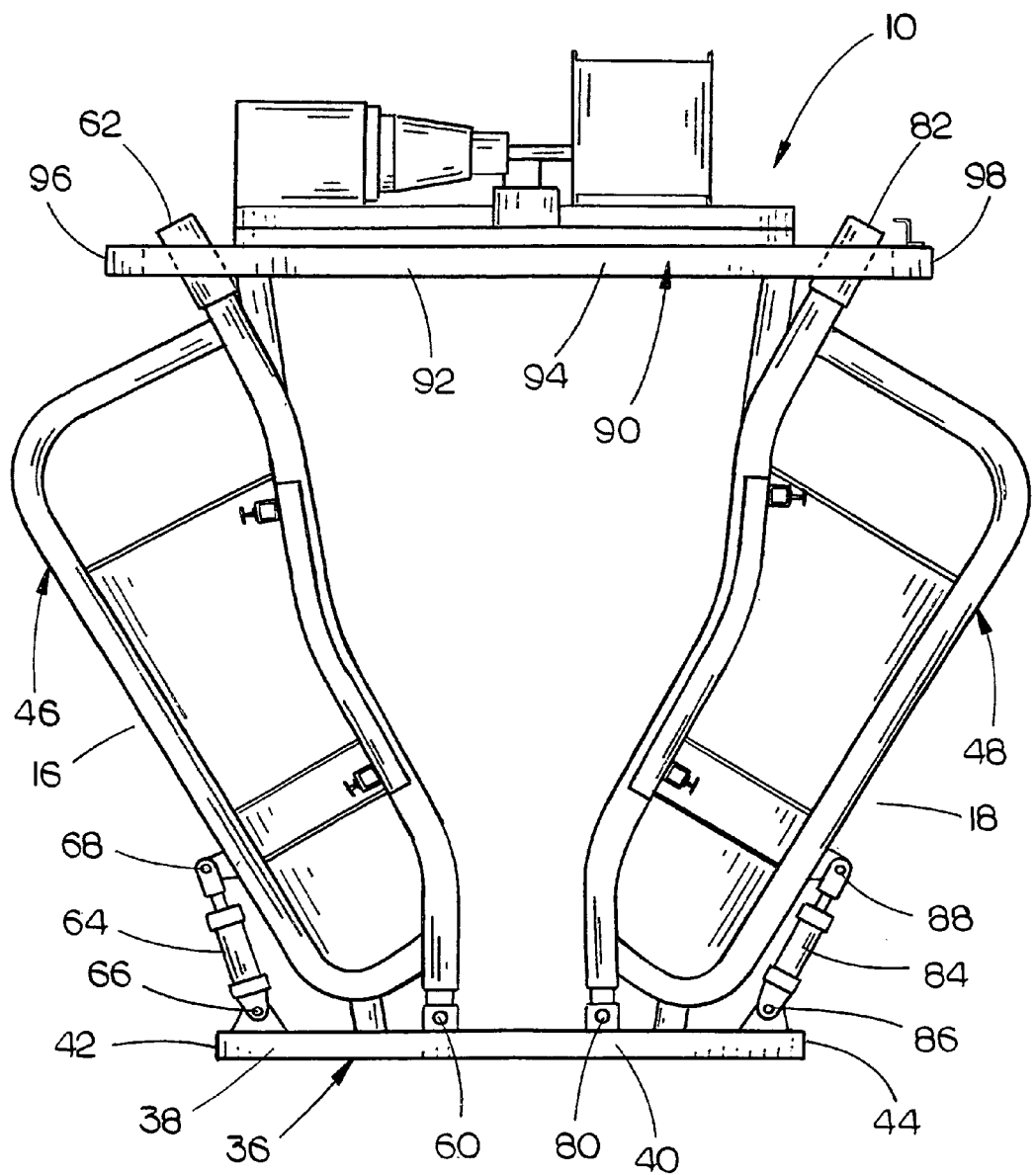
FIG. 4 is a front view of the squeeze chute with the head gate in a completely open position.

When the procedure has been performed on the animal, the head gate members 46 and 48 are moved to their open positions of FIG. 4 to allow the animal to exit the chute 10.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A livestock squeeze chute having a tail end and a head end, comprising:
   a lower frame having a tail end, a head end, a first side and a second side;
   an upper frame positioned above said lower frame and having a tail end, a head end, a first side and a second side;
   a tail gate assembly at said tail ends of said lower and upper frames for selectively closing the tail end of the chute;
   a horizontally disposed lower head gate support at the head end of said lower frame;
   said lower head gate support being generally V-shaped and including first and second elongated support members having rearward and forward ends;
   said first support member of said lower head gate support extending forwardly and inwardly in a straight line from said head end of said lower frame at said first side of said lower frame;
   said second support member of said lower head gate support extending forwardly and inwardly in a straight line from said head end of said lower frame at said second side of said lower frame;
   a horizontally disposed upper head gate support at the head end of said upper frame;
   said upper head gate support being generally V-shaped and including first and second elongate support members having rearward and forward ends;
   said first support member of said upper head gate support extending forwardly and inwardly in a straight line from said head end of said upper frame at said first side of said upper frame;
   said second support of said upper head gate support extending forwardly and inwardly in a straight line from said head end of said upper frame at said second side of said upper frame;
   said first support member of said upper head gate support having an elongated slot formed therein which has rearward and forward ends;
   said second support member of said upper head gate support having an elongated slot formed therein which has rearward and forward ends;
   a first upstanding head gate member having an upper end, a lower end, an outer side, an inner side, a forward side and a rearward side;
   a second upstanding head gate member having an upper end, a lower end, an outer side, an inner side, a forward side and a rearward side;
   said first head gate member being pivotally secured at its lower inner side, about a horizontal axis, to said first support member of said lower head gate support;
   said second head gate member being pivotally secured at its lower inner side, about a horizontal axis, to said second support member of said lower head gate support;
   said upper end of said first head gate member having a protrusion extending upwardly therefrom which is movably received by said slot in said first support member of said upper head gate support;
   said upper end of said second head gate member having a protrusion extending upwardly therefrom which is movably received by said slot in said second support member of said upper head gate support;
   said first and second head gates being selectively movable between open and closed positions in straight lines.

2. An elongated livestock squeeze chute having a tail end and a head end, comprising:
   a lower frame having a tail end, a head end, a first side and a second side;
   an upper frame positioned above said lower frame and having a tail end, a head end, a first side and a second side;
   a tail gate assembly at said tail ends of said lower and upper frames for selectively closing the tail end of the chute;
   a horizontally disposed lower head gate support at the head end of said lower frame;
   said lower head gate support being generally V-shaped and including first and second elongated support members having rearward and forward ends;
   said first support member of said lower head gate support extending forwardly and inwardly in a straight line from said head end of said lower frame at said first side of said lower frame;
   said second support member of said lower head gate support extending forwardly and inwardly in a straight line from said head end of said lower frame at said second side of said lower frame;
   a horizontally disposed upper head gate support at the head end of said upper frame;
   said upper head gate support being generally V-shaped and including first and second elongated support members having rearward and forward ends;
   said first support member of said upper head gate support extending forwardly and inwardly in a straight line from said head end of said upper frame at said first side of said upper frame;
   said second support of said upper head gate support extending forwardly and inwardly in a straight line from said head end of said upper frame at said second side of said upper frame;
   said first support member of said upper head gate support being parallel to said first support member of said lower head gate support and dwelling in an identical vertical plane as said first support member of said lower head gate support;
   said second support member of said upper head gate support being parallel to said second support member of said lower head gate support and dwelling in an identical vertical plane as said second support member of said lower head gate support;
   said first support member of said upper head gate support having an elongated slot formed therein which has rearward and forward ends;
   said second support member of said upper head gate support having an elongated slot formed therein which has rearward and forward ends;
   a first upstanding head gate member having an upper end, a lower end, an outer side, an inner side, a forward side and a rearward side;
   a second upstanding head gate member having an upper end, a lower end, an outer side, an inner side, a forward side and a rearward side;
   said first head gate member being pivotally secured, about a horizontal axis, at its lower inner side to said first support member of said lower head gate support;
   said second head gate member being pivotally secured, about a horizontal axis, at its lower inner side to said second support member of said lower head gate support;

said upper end of said first head gate member having a protrusion extending upwardly therefrom which is movably received by said slot in said first support member of said upper head gate support;

said upper end of said second head gate member having a protrusion extending upwardly therefrom which is movably received by said slot in said second support member of said upper head gate support;

a first power cylinder pivotally secured to and extending between said first support member of said lower head gate support and said first head gate member for pivotally moving said first head gate member between open and closed positions in a straight line; and a second power cylinder pivotally secured to and extending between said second support member of said lower head gate support member and said second head gate member for pivotally moving said second head gate member between open and closed positions in a straight line.

3. The livestock squeeze chute of claim 2 wherein said first and second power cylinders are hydraulic cylinders.

4. The livestock squeeze chute of claim 2 wherein said first power cylinder is pivotally connected to said rearward end of said first support member of said lower head gate support and wherein said second power cylinder is pivotally connected to said rearward end of said second support member of said lower head gate support.

5. The livestock squeeze chute of claim 4 wherein said first head gate member is pivotally connected to said first support member of said lower head gate support rearwardly of said forward end of said lower head gate support and wherein said second head gate member is pivotally connected to said second support member of said lower head gate support rearwardly of said forward end of said lower head gate support.

6. The livestock squeeze chute of claim 2 wherein each of said first and second support members of said lower head gate support and each of said first and second support members of said upper head gate support extends forwardly and inwardly at approximately a 30-degree angle with respect to the length of the squeeze chute.

\* \* \* \* \*